UNITED STATES PATENT OFFICE.

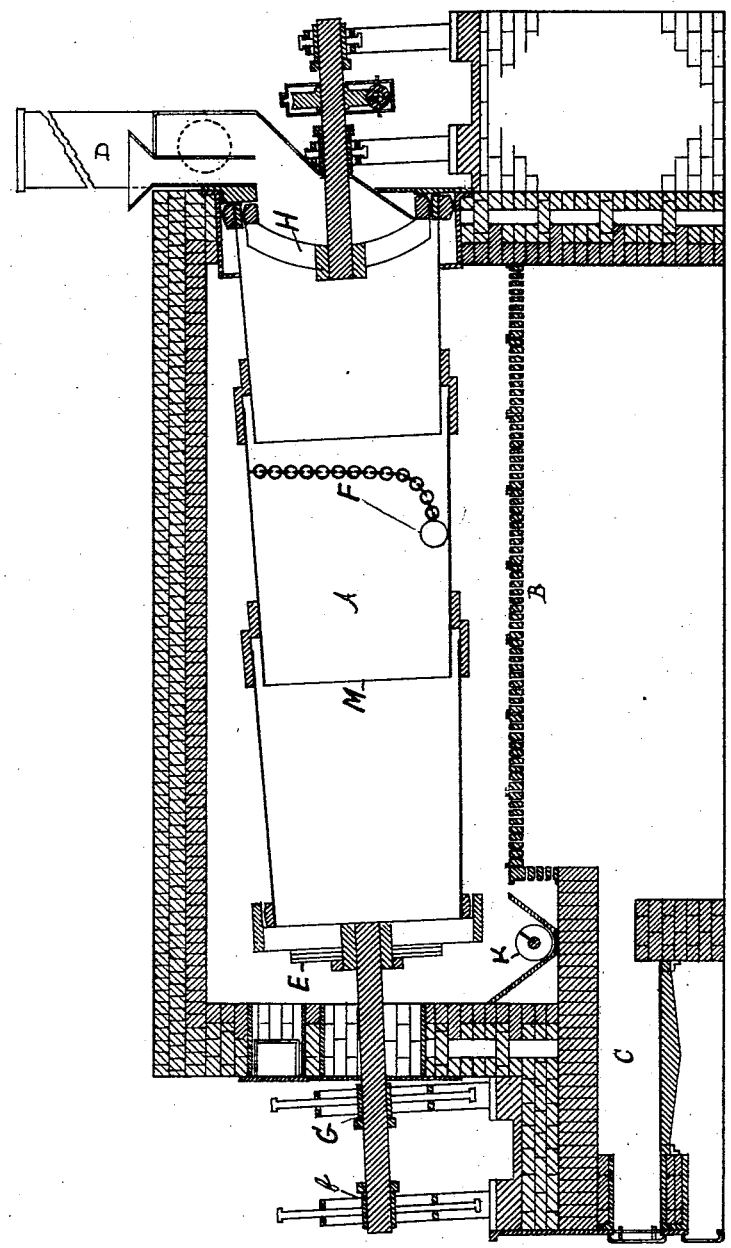

HERBERT H. WING, OF BUFFALO, NEW YORK.

DRIER.

SPECIFICATION forming part of Letters Patent No. 684,333, dated October 8, 1901.

Application filed December 15, 1896. Serial No. 615,822. (No model.)

*To all whom it may concern:*

Be it known that I, HERBERT H. WING, a citizen of the United States, residing at Buffalo, in the county of Erie and State of New York, have invented certain new and useful Improvements in Driers, of which the following is a specification.

The object of this present invention is to provide a means for securing a uniform temperature around receptacles wherein materials are heated, as the drying-shell of a rotary or other drier, and to increase the efficiency of such driers. When the products of the combustion of fuel are passed into the chamber in which the drying-shell containing the material to be dried revolves, there is great liability that at some places the temperature may rise high enough to ignite the material as it passes through the rotary shell or as it drops from the end to the trough by which it passes out of the drier-chamber. In order to obviate this serious difficulty, various means have been devised, among which may be mentioned the use of perforated firebrick arches, also the introduction of cold air, by which the temperature of the drying-gases is reduced. In both of these methods there is loss of heat and at the same time an imperfect result obtained. I have found that by the following means the temperature about the receptacle can be maintained without a variation of more than 10° in a day's run, a very excellent result, and also that the loss of heat is very small. The methods consist in placing just below or around the receptacle a diaphragm, preferably of perforated iron plates, so that the heating-gases before they can come into contact with the material or the receptacle containing the material have to pass through a certain thickness of iron or metal. The action of this perforated metal diaphragm is as a regenerator to make the gases passing through it to have a uniform temperature. As the hottest gases pass through this perforated metal diaphragm the diaphragm being a good conductor of heat absorbs this excessive heat, and consequently the gases when they emerge on the inner side are not so hot as they are on the outer. Then when gases of a lower temperature pass through the diaphragm they absorb the excess of heat which the hottest gases gave up to the diaphragm, and the result is that when they emerge on the inner side of the diaphragm they have become heated and are at about the same temperature of the gases which were too hot before they passed through the diaphragm. The diaphragm thus becomes a reservoir or regulator of temperature of the gases passing through it. By becoming a reservoir it radiates heat uniformly into the space surrounding the rotary shell which is in contrast to the fire-brick arches having holes the size of the bricks for the distribution of the hot gases into the chamber above in which the drying-cylinder revolves, which fire-brick arch reflects the heat down, and thereby valuable heat is lost. Then the action of the metal perforated diaphragm is also superior in another way to the fire-brick arch having holes in it for the distribution of the hot gases in that the hottest gases are reduced in temperature as they emerge on the inner side and the cold gases hotter, while with the firebrick arch the hottest gases are not reduced in temperature when they emerge on the inner side, as the fire-brick being a non-conductor of heat in contrast to a metal the heat accumulates at these openings, and instead of modifying the heat of the gases the holes in the fire-brick arch simply distribute the hot gases. The openings in the diaphragms are so proportioned and arranged that all the gases in order to pass upward must be distributed over the entire area of the diaphragm.

The accompanying drawing is a vertical cross-section of a rotary drier, in which A represents the rotary shell; B, the perforated metal diaphragm, (the diaphragm can be located at other places than shown on this drawing without departing from this invention, as a circular diaphragm could be placed around the rotating shell; but the design as shown illustrates its simple form;) C, the furnace-chamber, in which the fuel is consumed; D, the stack, through which the drying-gases pass into the air containing the vapor of water absorbed from the material being dried.

E represents a damper placed across the discharge end of the shell A, which can be opened or closed. This damper allows the regulation of the temperature of the discharged material, as by closing it the area of the discharge end of the cylinder is reduced, and as a suction-fan is located in the stack D, (see dotted lines,) which continually draws a constant volume of the drying-gases through the shell A, it follows that when the damper E is closed in order for the suction-fan to to continually draw a certain volume of the drying-gases a larger volume has to pass through the inlets between the sections and less through the discharge end of the shell. When a smaller volume of the hot gases passes through the discharge end, the material, as it is discharged, is not heated to so high a temperature as when a larger volume of the hot gases passes in the shell at this place. By adjusting the opening of the discharge end a great variation of the temperature of the discharged material can be obtained, an object which is very desirable.

F represents a ball attached to the inside of the shell A by a chain.

G G represent adjustable bearings at the discharge end of the rotary drier. By making crowning or curving the bearing-surface of the front spider H it is possible to change the pitch of the drier by raising or lowering the discharge end without producing any binding. As is shown in the drawing, a very great variation in the pitch is possible. This is a very desirable feature, as by changing the pitch the length of time which the material remains in the drier can be regulated—the greater the pitch the quicker the material will pass through, and, vice versa, the less the pitch the longer the material will be in passing through. By this arrangement a very great variation in the drying effect can be produced, so that a single drier can be adapted to work on very different materials by simply making these adjustments.

K represents an ordinary conveyer, which conveys the material which is discharged from the shell to the outside of the drier.

I claim as my invention—

The combination with a receptacle containing material to be heated and arranged within a chamber, a source of heat as a fireplace communicating with said chamber and a metallic diaphragm filling substantially the entire passage between the fireplace and the chamber and provided with minute perforations proportioned and arranged to prevent the heated gases from passing through only a part of the diaphragm at one time and to secure a regenerating action by the diaphragm, substantially as described.

HERBERT H. WING.

Witnesses:
CHARLES E. FITE,
W. CLARENCE DUVALL.